July 15, 1969

G. R. KEEPIN 3,456,113

DETECTION, IDENTIFICATION AND ANALYSIS OF
FISSIONABLE ISOTOPES

Filed June 13, 1967

INVENTOR.
G. Robert Keepin
BY

United States Patent Office 3,456,113
Patented July 15, 1969

3,456,113
DETECTION, IDENTIFICATION AND ANALYSIS
OF FISSIONABLE ISOTOPES
G. Robert Keepin, Los Alamos, N. Mex., assignor to the
United States of America as represented by the United
States Atomic Energy Commission
Filed June 13, 1967, Ser. No. 646,157
Int. Cl. H01j 39/32; G01t 3/00
U.S. Cl. 250—83.1                                    9 Claims

ABSTRACT OF THE DISCLOSURE

An apparatus and method of detecting, identifying and quantitatively analyzing the individual isotopes in unknown mixtures of fissionable materials. A neutron source irradiates the unknown mixture and the kinetic behavior of the delayed neutron activity from the system is analyzed with a neutron detector and time analyzer. From the known delayed neutron response of the individual fission species it is possible to determine the composition of the unknown mixture. Analysis of the kinetic response may be accomplished by a simple on-line computer enabling direct readout of isotopic assay.

---

The present invention is a combination of two groups of methods for non-destructive isotopic analysis. The first group consists of the $R_f$ and $S_f$ kinetic response methods, multichannel time and energy analysis, and absolute source and detector calibration techniques for isotopic analysis of materials in subcritical configurations; the second group of methods consists of reactor shutdown decay analysis, pulsed reactor or pulsed source decay analysis and reactor transfer function analysis for determining isotopic composition in operating reactors and fission chain reacting systems.

All component methods utilize the physical characteristics of delayed neutrons and their kinetic response to provide a sensitive means of discrimination between the various fissionable species. Based on calculated end point energies for the delayed neutron emission spectra from identified fission product precursors, considerably increased discrimination between the various fissionable species can be further realized by the use of energy-sensitive neutron detectors.

The delayed neutron kinetic response methods described herein can be readily applied to the determination of absolute amounts of fissionable materials present in unknown systems by suitable source and detector calibration. Thus, for example, the absolute amounts of individual fissile and fertile species in spent reactor fuel elements can be determined directly and nondestructively by straightforward calibration of delay neutron response measurements.

Besides practical applications to isotope identification and analysis in mixed systems, the present methods are shown to be especially sensitive to "special" (fissile) versus "safe" (fertile) fissionable materials—a distinction of great practical importance in nuclear inspection and surveillance techniques. Full exploitation of the methods described herein promises a wide range of applications in the nuclear industry as well as in the emerging field of national and international nuclear safeguards and control.

The symbols utilized in the following description are conventional in the art and are more particularly fully explained in G. R. Keepin, Physics of Nuclear Kinetics, Addison Wesley Publishing Co., Reading, Mass. (1965). (Library of Congress Catalog Card No. 64–20831.)

Subcritical configurations

The decay of delayed neutron activity following neutron-induced fission of various fission species (isotopes) has been measured and analyzed into six major groups based on their decay periods which range from $\sim 0.2$ sec. to $\sim 55$ sec. Although the six group periods are similar (but not identical) for all the major species undergoing neutron-induced fission, marked differences have been observed in relative group abundances and energy spectra of delayed neutrons from the various fissioning species.

By detailed examination of the mass and charge distributions of the various fissioning species, these delayed neutron yield and spectral differences have been correlated with the known variation of average fission chain length from one fissioning isotope to another. Thus the longer average $\beta$-decay chain lengths in fission of the high-neutron/proton-ratio species (e.g., $U^{238}$ and $Th^{232}$) account for increased yields of particular (especially short period) delayed neutron precursors which exhibit minor or negligible yields in fission of the shorter-chain-length ("low" neutron/proton ratio) species, such as $U^{233}$ and $Pu^{239}$. This "chain length effect" is most apparent among the short period delayed neutron groups; i.e., the increase of fission chain lengths in the sequence: $U^{233}$, $Pu^{239}$, $Pu^{240}$, $U^{235}$, $Th^{232}$ and $U^{238}$ fission, correlates directly with increasing absolute yield of the fifth and sixth (shortest) delayed neutron groups as one progresses through the sequence from $U^{233}$ to $U^{238}$.

These delayed neutron yield differences (as well as associated spectral differences to be discussed later) are uniquely characteristic of the individual fission species, and can be exploited to provide a unique method for non-destructive detection, identification and analysis of individual fission isotopes in unknown mixtures of fissionable and nonfissionable materials.

In essence, the major technique described herein involves irradiation of a system or sample of unknown composition with an intense, "instantaneous" pulse of neutrons (i.e., pulse duration short compared to all delayed neutron periods, $\tau_i$) and analyzing, by special methods, the measured kinetic behavior of delayed neutron activity following the pulse. Modulated or DC (i.e., saturation) irradiations may be similarly analyzed to provide complementary data to that obtained by the pulsed technique. As will be seen below, the short pulse irradiations (short compared to all $\tau_i$) generally provide optimum discrimination between the delayed neutron response curves of the different fissioning species. Neutron irradiations of varying duration can be produced by a compact ion accelerator, neutron flash tube, focused plasma or thermonuclear pulsed neutron source, radioactive $\alpha,n$ or $\gamma,n$ neutron sources, and by continuous or pulsed reactor (e.g., Godiva-type burst facility).

To outline briefly the analytical basis of the present method, we start with the delayed neutron emission function $D(t)$ which expresses the time dependence of delayed neutron activity following an instantaneous neutron irradiation (irradiation time, $T \ll \tau_i$) producing $\dot{F}T$ fissions in the irradiated sample:

$$D(t) = (\beta\bar{\nu})\dot{F}T \sum_{i=1}^{6} a_i \lambda_i e^{-\lambda_i t} \quad (1)$$

Here, $\beta\bar{\nu}$ (sometimes also designated $n/F$) is the absolute yield of delayed neutrons per fission and $a_i$, $\lambda_i$ are the measured abundances and decay constants of the delayed neutron groups for a given fissioning species. We wish to compare the numbers of delayed neutrons emitted in various time intervals following both instantaneous and saturation irradiations. First we consider a single fission species; later the results will be generalized to mixtures of several different fission species.

The number of delayed neutrons emitted between $t=0$ (end of irradiation) and an arbitrary time fiducial, $f$ following an instantaneous irradiation is $$\int_0^f D(t)dt = (\beta\bar{\nu})\dot{F}T \int_0^f \sum_i a_i \lambda_i e^{-\lambda_i t} dt =$$
$$(\beta\bar{\nu})\dot{F}T \sum_i a_i (1 - e^{-\lambda_i f}) \quad (2)$$

For the special cases of very short and very long counting times, Equation 2 reduces to $$\int_0^f D(t)dt \to (\beta\bar{\nu})\dot{F}Tf \sum_i a_i \lambda_i \text{ for } f \ll \tau_i$$
$$\to (\beta\bar{\nu})\dot{F}T \quad \text{for } f \gg \tau_i \quad (3)$$

(It may be noted that the case $$\int_0^\infty D(t)dt \to (\beta\bar{\nu})\dot{F}T$$

forms the basis of the prompt burst method of measuring absolute delayed neutron yields. This method has been used to measure absolute delayed neutron yields in fast and thermal fission of all the main fission species of practical interest.)

It follows that the *fraction*, $R_{f-}$, of delayed neutrons emitted in the interval $0 < t < f$ following an instantaneous irradiation is given by $$R_{f-} = \frac{\int_0^f D(t)dt}{\int_0^\infty D(t)dt} = \frac{(\beta\bar{\nu})\dot{F}T \sum_i a_i(1 - e^{-\lambda_i f})}{(\beta\bar{\nu})\dot{F}T} =$$
$$\sum_i a_i(1 - e^{-\lambda_i f}) \quad (4)$$

For later use we introduce the complementary fraction $$R_{f+} = 1 - R_{f-} = \sum_i a_i e^{-\lambda_i f} \quad (5)$$

which is simply the fraction of delayed neutrons emitted after time fiducial, $f$, (i.e., in the interval $f < t < \infty$).

Turning to the case of *saturation irradiations*, the emission function $D_S(t)$ represents delayed neutron activity as a function of time following a saturation irradiation (irradiation time, $T \gg \tau_i$) at constant fission rate, $\dot{F}$:

$$D_S(t) = (\beta\bar{\nu})\dot{F} \sum_i a_i e^{-\lambda_i t} \quad (6)$$

Hence the number of delayed neutrons emitted in the time interval $0 < t < f$ following a saturation irradiation is:

$$\int_0^f D_S(t)dt = (\beta\bar{\nu})\dot{F} \int_0^f \sum_i a_i e^{-\lambda_i t} dt =$$
$$(\beta\bar{\nu})\dot{F} \sum_i (a_i/\lambda_i)(1 - e^{-\lambda_i f}) \quad (7)$$

which reduces to $$\int_0^f D_S(t)dt \to (\beta\bar{\nu})\dot{F}f \quad \text{for } f \ll \tau_i$$
$$\to (\beta\bar{\nu})\dot{F} \sum_i a_i/\lambda_i \text{ for } f \gg \tau_i \quad (8)$$

The *fraction*, $S_f$, of delayed neutrons emitted in $0 < t < f$ following a saturation irradiation is given by $$S_f \equiv \frac{\int_0^f D_S(t)dt}{\int_0^\infty D_S(t)dt} = \frac{(\beta\bar{\nu})\dot{F} \sum_i (a_i/\lambda_i)(1 - e^{-\lambda_i f})}{(\beta\bar{\nu})\dot{F} \sum_i a_i/\lambda_i} \quad (9)$$

which reduces to $$S_f \to \frac{(\beta\bar{\nu})\dot{F}f}{(\beta\bar{\nu})\dot{F} \sum_i a_i/\lambda_i} = \frac{f}{\sum_i a_i/\lambda_i} \text{ for } f \ll \tau_i$$
$$\to \text{unity} \quad \text{for } f \gg \tau_i \quad (10)$$

We now extend the previous definitions of $R_{f-}$ and $S_f$ for a single fission isotope to the corresponding functions $\overline{R_{f-}}$ and $\overline{S_f}$ for a mixture of different fission species, denoted by the index $q$ (in general the number of major fissioning species in a given system or device will not exceed 3, or in rare instances, 4). Thus for instantaneous irradiations, Equation 4 may be generalized as follows:

$$\overline{R_{f-}} = \frac{\sum_q (\beta\bar{\nu})^q \dot{F}^q T \sum_i a_i^q (1 - e^{-\lambda_i^q f})}{\sum_q (\beta\nu)^q \dot{F}^q T} \quad (11)$$

which is simply a weighted sum of the known delayed neutron kinetic functions $$\sum_i a_i^q (1 - e^{-\lambda_i^q f})$$

for each isotope, $q$, the weighting factor being the fractional delayed neutron yield (or production) from each isotope. For the special case of very short $f$, Equation 11 reduces to $$\overline{R_{f-}} \to \frac{\sum_q (\beta\bar{\nu})^q \dot{F}^q f \sum_i a_i^q \lambda_i^q}{\sum_q (\beta\bar{\nu})^q \dot{F}^q} \text{ for } f \ll \tau_i \quad (12)$$

which again is simply a weighted sum of the known functions $$\sum_i a_i \lambda_i$$

for each isotope. From measured delayed neutron decay characteristics for all the major fission species, precise numerical values of $$\sum_i a_i \lambda_i$$

and their propagated errors (as well as the first and second moments of the delayed neutron decay constants and mean lives) have been determined recently for all major fission species.

For saturation irradiations, Equation 9 may be generalized as follows:

$$\overline{S_f} \to \frac{\sum_q (\beta\bar{\nu})^q \dot{F}^q \sum_i a_i^q/\lambda_i^q (1 - e^{-\lambda_i^q f})}{\sum_q (\beta\bar{\nu})^q \dot{F}^q \sum_i a_i^q/\lambda_i^q} \quad (13)$$

For the special case of very short $f$, Equation 13 reduces to $$\overline{S_f} \to \frac{\sum_q (\beta\bar{\nu})^q \dot{F}^q f}{\sum_q (\beta\bar{\nu})^q \dot{F}^q \sum_i a_i^q/\lambda_i^q} \text{ for } f \ll \tau_i \quad (14)$$

and the *reciprocal* of $\overline{S_f}$ is again a delayed-neutron-yield weighted sum of the known kinetic functions $$\sum_i a_i{}^q/\lambda_i{}^q$$

Since the expression $\overline{S_f}$, given in Equation 13, does not lend itself to isotope analysis applications, an alternative formulation is the ratio, $\overline{S_{f^-/\Delta}}$, of delayed neutrons emitted in the time interval $0 < t < f$ following a saturation irradiation, to those emitted in a fixed short time interval, $\Delta \ll \tau_i$ following the irradiation $$\overline{S_{f^-/\Delta}} = \frac{\sum_q (\beta \bar{\nu})^q \dot{F}^q \sum_i (a_i{}^q/\lambda_i{}^q)(1 - e^{-\lambda_i{}^q t})}{\Delta \sum_q (\beta \bar{\nu})^q \dot{F}^q} \quad (15)$$

We also introduce the complementary ratio, $\overline{S_{f^+/\Delta}}$, for delayed neutrons emitted *after* time fiducial, $f$ (i.e., in the time interval $f < t < \infty$):

$$\overline{S_{f^+/\Delta}} = \frac{\sum_q (\beta \bar{\nu})^q \dot{F}^q \sum_i (a_i{}^q/\lambda_i{}^q) e^{-\lambda_i{}^q f}}{\Delta \sum_q (\beta \bar{\nu})^q \dot{F}^q} \quad (16)$$

These expressions have the desired tractable form of a weighted sum of known delayed neutron kinetics functions for each isotope, $q$, the weighting function being, as before, the fractional delayed neutron production from each fissioning species.

Letting [W] symbolize the process of weighting with fractional delayed neutron production from each fission species present in a given mixture, the preceding development can be summarized very simply as follows:

For Burst Irradiations:

$$\overline{R_{f^-}} = [W] \sum_i a_i (1 - e^{-\lambda_i f})$$

$$\overline{R_{f^+}} = [W] \sum_i a_i e^{-\lambda_i f} \quad (17)$$

For Saturation Irradiations:

$$\overline{S_{f^-/\Delta}} = \Delta^{-1}[W] \sum_i a_i/\lambda_i (1 - e^{-\lambda_i f})$$

$$\overline{S_{f^+/\Delta}} = \Delta^{-1}[W] \sum_i a_i/\lambda_i e^{-\lambda_i f} \quad (18)$$

Limiting values of these functions for very small and very large values of $f$ are tabulated below.

| $f \ll \tau_i$ | Quantity | $f \gg \tau_i$ |
|---|---|---|
| $f[W]\sum_i a_i \lambda_i$ | $\overline{R_{f^-}}$ | 1 |
| 1 | $\overline{R_{f^+}}$ | 0 |
| $f/\Delta$ | $\overline{S_{f^-/\Delta}}$ | $\Delta^{-1}[W]\sum_i a_i/\lambda_i$ |
| $\Delta^{-1}[W]\sum_i a_i/\lambda_i$ | $\overline{S_{f^+/\Delta}}$ | 0 |
| $f\{[W]\sum_i a_i/\lambda_i\}^{-1}$ | $\overline{S_f}$ | 1 |

Precise numerical values of $$\sum_i a_i \lambda_i$$

and $$\sum_i a_i/\lambda_i$$

have been determined recently, together with their least-squares propagated uncertainties, for all the major fission species. These data are included in the following table giving first and second moments of the delayed neutron decay constants and mean lives.

TABLE I.—MOMENTS OF DELAYED-NEUTRON MEAN-LIVES AND DECAY CONSTANTS (INCLUDING LEAST-SQUARES PROPAGATED UNCERTAINTIES)

| | $U^{235}$ | $U^{233}$ | $Pu^{239}$ |
|---|---|---|---|
| $\Sigma a_i/\lambda_i$ (sec.) | 12.753±0.1834 | 17.876±0.2866 | 14.6445±0.1698 |
| $\Sigma a_i \lambda_i$ (sec.$^{-1}$) | 0.4353±0.0109 | 0.3004±0.0194 | 0.3888±0.0126 |
| $\Sigma a_i/\lambda_i{}^2$ (sec.$^2$) | 466.05±12.643 | 804.07±22.302 | 532.94±10.957 |
| $\Sigma a_i \lambda_i{}^2$ (sec.$^{-2}$) | 0.682±0.0464 | 0.376±0.065 | 0.564±0.042 |

| | $Pu^{240}$ | $U^{238}$ | $Th^{232}$ |
|---|---|---|---|
| $\Sigma a_i/\lambda_i$ (sec.) | 13.467±0.2624 | 7.6803±0.1025 | 10.059±0.1657 |
| $\Sigma a_i \lambda_i$ (sec.$^{-1}$) | 0.4426±0.0255 | 0.7847±0.0179 | 0.5169±0.0165 |
| $\Sigma a_i/\lambda_i{}^2$ (sec.$^2$) | 460.68±11.636 | 219.10±4.313 | 370.62±8.965 |
| $\Sigma a_i \lambda_i{}^2$ (sec.$^{-2}$) | 0.753±0.111 | 1.712±0.080 | 0.766±0.057 |

The $\overline{R_f}$ (burst-response) functions clearly emphasize the shorter-period delayed neutron groups and the $\overline{S_f}$ (saturation-response) functions emphasize the longer-period groups. This capability for selective emphasis of both extremes of the delayed neutron period spectrum provides two complementary time-fiducial methods for identification and analysis of individual fission isotopes. Intermediate cases (between pulsed and saturation irradiations) are clearly obtainable through the use of modulated neutron source.

From the foregoing development it follows that measured values of $\overline{R_f}$ (and also $\overline{S_{f/\Delta}}$, when desired) for various $f$ values (time fiducials defining various time intervals) can be used to determine fractional delayed neutron yields from each major fission isotope in a given mixture of fissioning species. In such an analysis a linear superposition on known kinetic functions $$(\text{e.g.,} \ \sum a_i(1 - e^{-\lambda_i f})$$

in the case of $\overline{R_{f^-}}$ measurements with unknown coefficients (fractional delayed neutron yields) is obtained in each time interval. The number of simultaneous equations in these coefficients (i.e., number and range of time intervals) can be judiciously chosen to suit the precision of the experimental data and to optimize the sensitivity and accuracy of the analysis in a given situation.

Figure 1:
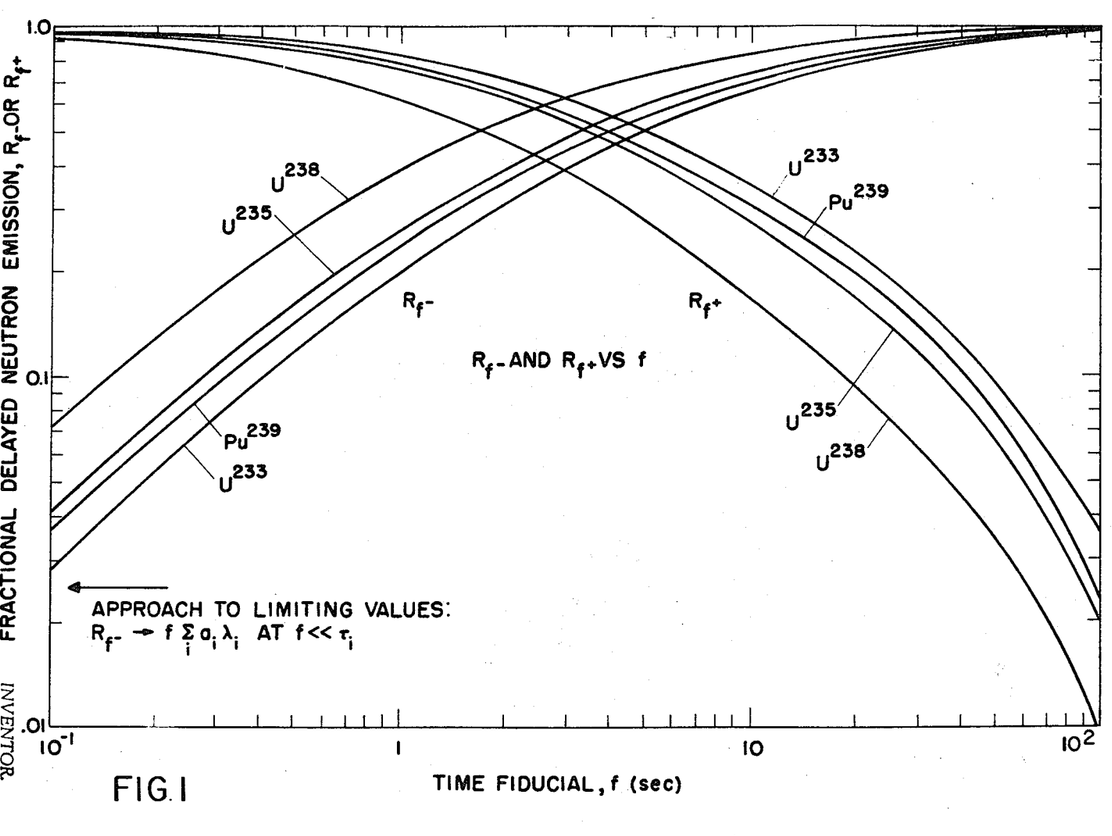
FIGURE 1 is a plot of the $R_{f-}$ and $R_{f+}$ functions against a variable time fiducial, $f$.
Figure 2:
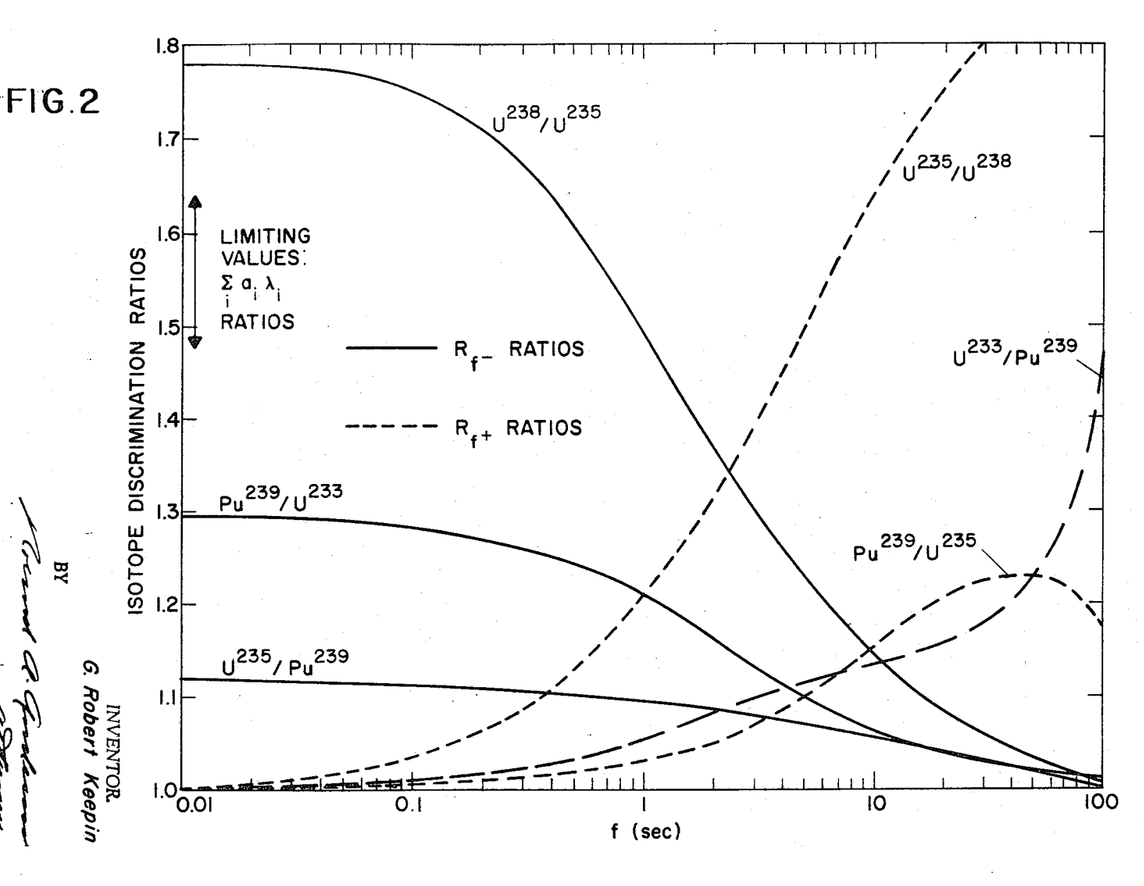
FIGURE 2 shows isotope discrimination ratios using the $R_f$ method against time fiducial, $f$, for various combinations of isotopes.

To indicate generally the capabilities and accuracy of the time fiducial method, we examine the dependence of $R_f$ and $S_f/\Delta$ functions on $f$. Computer calculations of $R_{f^-}$ and $R_{f^+}$ versus $f$ are plotted in FIG. 1 for $U^{235}$, $U^{238}$, $U^{233}$, and $Pu^{239}$. Each $R_{f^-}$ curve approaches its limiting value $$f \sum_i a_i \lambda_i$$

for small $f$. Relative magnitudes of $R_{f^-}$ values (and $R_{f^+}$ values, as well) for the different isotopes are clearly an index of the sensitivity or isotope-discrimination-power of the $\overline{R_f}$ method. Ratios of $R_{f^-}$ and $R_{f^+}$ values—"isotope discrimination ratios"—as a function of $f$ are shown in FIG. 2 where appropriate limiting values are again indicated for small $f$. It is seen that optimum isotope discrimination in $R_{f^-}$ measurements is obtained in the range of small $f$ values ($< 0.1$ sec., say), while optimum discrimination in $R_{f^+}$ measurements is obtained at the larger $f$ values ($> 10$ sec., say).

The ratios, $R_{f^-}/R_{f^+}$ for each species, can be used to provide still greater discrimination between individual species, as will be discussed below. It may be noted here that such ratios—[e.g., $R_{f^-}$ (0.1 sec.)/$R_{f^+}$ (50 sec.)]—constitute a measure of the average delayed neutron decay "slopes" (early to late neutron emission) for the individual species.

Figure 3:
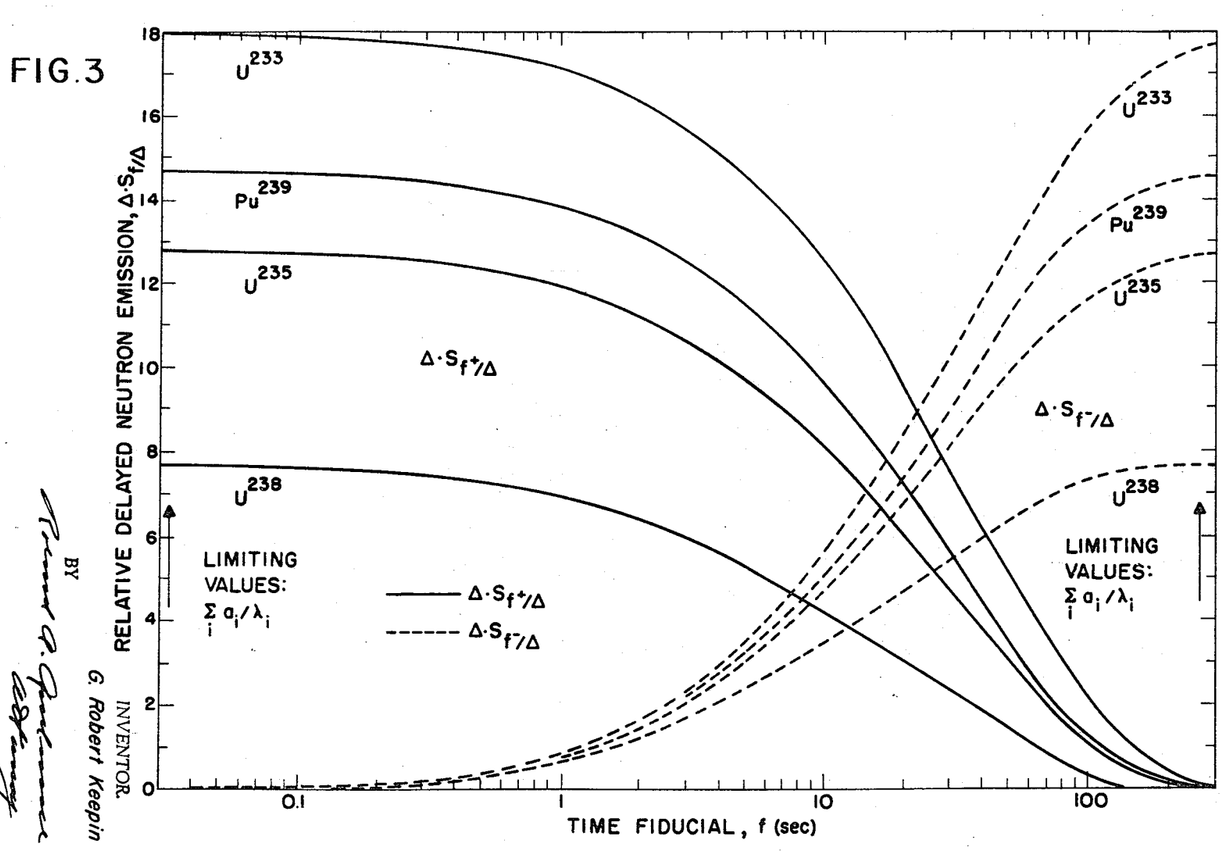
FIGURE 3 is a plot of the $\Delta \cdot S_{f+/\Delta}$ and $\Delta \cdot S_{f-/\Delta}$ functions against variable time fiducial, $f$.
Figure 4:
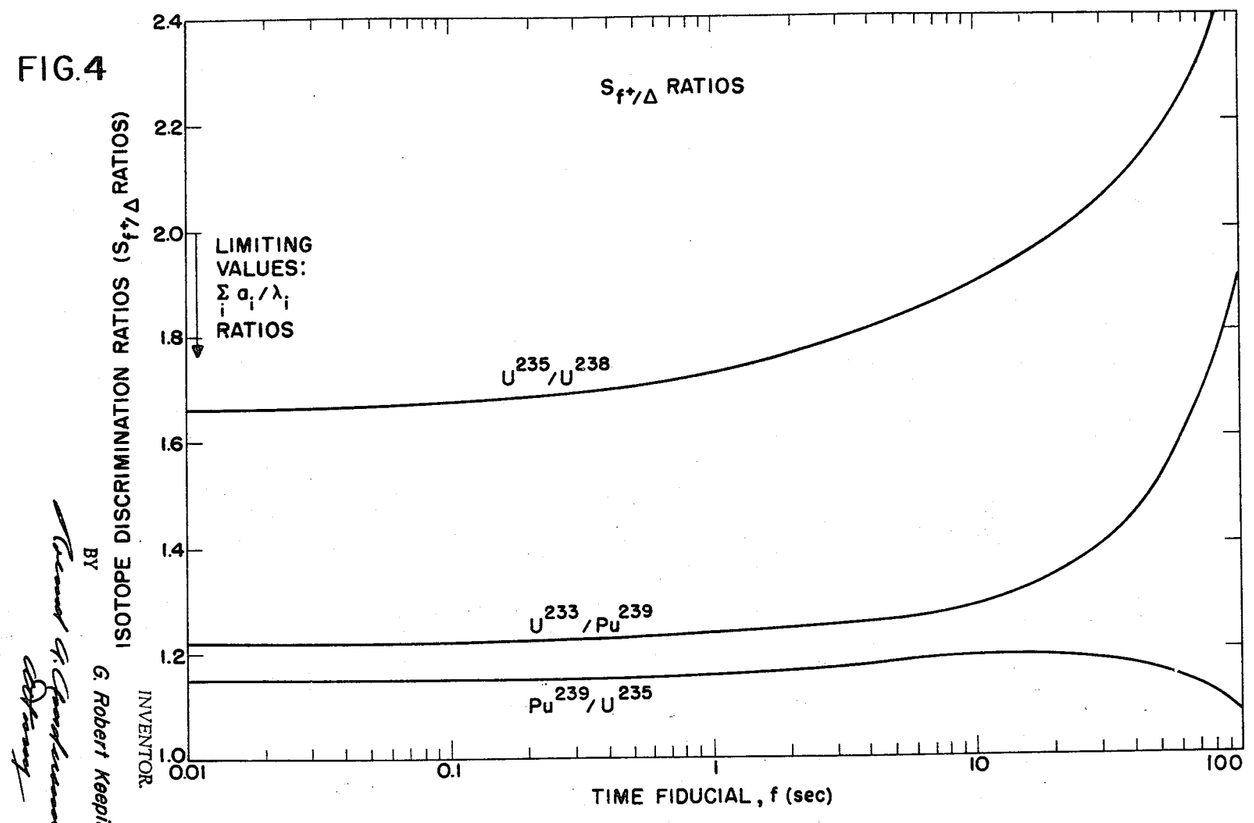
FIGURE 4 shows isotope discrimination ratios using the $\Delta \cdot S_{f/\Delta}$ method against time fiducial, $f$, for various isotope mixtures.

Computer calculations of the kinetic functions $\Delta \cdot S_{f^+/\Delta}$ and $\Delta \cdot S_{f^-/\Delta}$ versus $f$ (cf. Equation 18) are plotted in FIG. 3 for $U^{235}$, $U^{238}$, $U^{233}$, and $Pu^{239}$. Appropriate limiting values, $$\sum_i a_i/\lambda_i$$

are indicated at large and small $f$. Ratios of $S_{f^+/\Delta}$ values are plotted in FIG. 4. $S_{f^-/\Delta}$ ratios are not plotted as they are generally too small to be of practical interest, i.e., their *maximum* limiting value is $$\sum_i a/\lambda_i$$

at large $f$, which is just the limiting *minimum* value of $S_{f+/\Delta}$ ratios (at small $f$).

In the respective time regions of their maximum values, $R_{f-}$ and $R_{f+}$ ratios emphasize completely different extremes of the delayed neutron period-spectrum, and hence constitute essentially independent measurements. Accordingly, we multiply appropriate optimum ratio values (from FIGS. 2 and 4) together to obtain "effective discrimination factors" (cf. Table II) for the two isotopes concerned. These factors are seen to be simply ratios of delayed-neutron-decay "slopes" as defined above for the individual species.

It is noteworthy that an effective discrimination factor as large as 10 is obtainable between the uranium isotopes $U^{238}$ and $U^{233}$, a factor of 5 between $U^{238}$ and $Pu^{239}$, and a factor of over 3 between $U^{238}$ and $U^{235}$. Similarly excellent discrimination is obtainable between $U^{233}$ and $Th^{232}$; the $\overline{R_f}$ and $\overline{S_{f/\Delta}}$ methods should find extensive practical applications to assay and burnup determinations in $Th^{232}$–$U^{233}$ breeders and converters as well as to $U^{238}$–$Pu^{239}$ systems. Also the large effective discrimination factor between $U^{235}$ and $U^{238}$ recommends the present methods for rapid, nondestructive determination of isotopic abundances in enriched uranium fuel samples. The smallest discrimination factor ($\sim 1.4$) is obtained between $U^{235}$ and $Pu^{239}$.

TABLE II.—EFFECTIVE ISOTOPE DISCRIMINATION FACTORS OBTAINED FROM $R_{f-}$, $R_{f+}$, AND $S_{f/\Delta}$ MEASUREMENTS

| Isotopes | $R_f^-$ Ratio (f=0.1 sec.) | $R_f^+$ Ratio (f=50 sec.) | Effective Discrimination Factor ($R_f^-$ and $R_f^+$) | $S_f^+/\Delta$ Ratio (f=50 sec.) | Effective Discrimination Factor ($R_f^-$ and $S_f^+/\Delta$) |
|---|---|---|---|---|---|
| $U^{238}$, $U^{235}$ | 1.75 | 1.88 | 3.30 | 2.18 | 3.80 |
| $U^{238}$, $Pu^{239}$ | 2.0 | 2.3 | 4.60 | 2.60 | 5.2 |
| $U^{238}$, $U^{233}$ | 2.56 | 2.85 | 7.30 | 4.0 | 10.2 |
| $U^{235}$, $Pu^{239}$ | 1.12 | 1.23 | 1.38 | *1.19 | 1.33 |
| $U^{235}$, $U^{233}$ | 1.42 | 1.52 | 2.15 | 1.82 | 2.60 |
| $Pu^{239}$, $U^{233}$ | 1.28 | 1.23 | 1.58 | 1.52 | 1.94 |

*At f=20 sec.

It is clear from FIGS. 2 and 4 that still higher discrimination factors between all combinations of isotopes in Table II (except $Pu^{239}$ and $U^{235}$) are possible using $f$ values larger than 50 sec. In some cases, however, the available delayed neutron intensity may limit the statistical accuracy of $R_f^+$ or $C_f^+/\Delta$ measurements for $f > 50$ sec. (cf. later discussion of experimental technique and accuracy of measurements).

Before any analysis of relative amounts of fissionable material can be carried out, one must first identify the major fission isotopes present in a given system. Consider first the response to fast neutron (e.g., 14 mev.) pulsed irradiations. From FIG. 1 we see that the presence of $U^{238}$ as a major fissioning species will be indicated by measured $\overline{R_f^-}$ values in excess of the corresponding $R_f^-$ ($U^{235}$) by more than a few percent. The same conclusion holds if measured $\overline{R_f^+}$ is less than $R_f^+$ ($U^{235}$) by more than a few percent. In specific numerical terms this means, for example, that $U^{238}$ is present if measured $\overline{R_f^-} \gtrsim .045$ at $f = 0.1$ sec., or if $\overline{R_f^+} \gtrsim .06$ at $f = 50$ sec. Similarly for saturation irradiations in FIG. 3, if measured $\Delta \cdot \overline{S_f^+/\Delta}$ is less than $\sim 12$ for $f \leq 0.5$ sec., then $U^{238}$ is present as a major fissioning species. This same approach can be applied to identification of $U^{233}$ as a major fissioning species in an unknown system. Thus typical measurements establishing the presence of $U^{233}$ would be $\overline{R_f^-} \lesssim .035$ at $f = 0.1$ sec., $\overline{R_f^+} \gtrsim .085$ at $f = 50$ sec., or $\Delta \cdot \overline{S_f^+/\Delta} \gtrsim 15$ for $f \leq 1$ sec.

Identification of individual species can be carried out still more effectively on the basis of $R_f^-/R_f^+$ ratios (delayed neutron decay "slopes") for the individual species. Numerical values of these slopes (for the time fiducials 0.1 sec. and 50 sec.) are given in Table III.

TABLE III.—AVERAGE DELAYED NEUTRON DECAY "SLOPES" CHARACTERISTIC OF INDIVIDUAL FISSION SPECIES

| Fission species: | $R_f^-(0.1 \text{ sec.})/R_f^+(50 \text{ sec.})$ |
|---|---|
| $U^{238}$ | 2.06 |
| $U^{235}$ | 0.626 |
| $Pu^{239}$ | 0.458 |
| $U^{233}$ | 0.290 |

Delayed neutron decay slopes—being a combination of $R_f^-$ and $R_f^+$ values—provide a more sensitive measurable characteristic of individual fission species than either $R_f^-$ or $R_f^+$ values alone, in specific numerical terms, if the observed slope, $R_f^-$ (0.1 sec.)/$R_f^+$ (50 sec.), of an unknown mixture of fissioning materials exceeds 0.7, for example, the presence of $U^{238}$ is clearly indicated (cf. Table III). Similarly the presence of $U^{233}$ is indicated if measured delayed neutron decay slope falls below $\sim 0.44$. In systems where $U^{233}$ is not present (which in fact applies to nearly all practical cases) a measured decay slope less than $\sim 0.60$ would indicate the presence of $Pu^{239}$.

From a practical standpoint, the actual degree of discrimination ultimately obtainable between fission species as similar as $U^{235}$ and $Pu^{239}$ (which exhibit the smallest difference in delayed neutron kinetic characteristics) must be investigated experimentally. Many approaches are possible, and warrant further careful and systematic laboratory investigation under various practical conditions. For example, in systems where the other major fission isotopes are identified, and there remains only ambiguity between $U^{235}$ vs. $Pu^{239}$, one can make several measurements at well-chosen $f$ values (or take detailed multichannel time analyzer data; cf. subsequent section on time analyzer techniques) and perform least-squares fits to the data assuming, in turn, the presence of $Pu^{239}$ and then $U^{235}$. The speed of convergence and/or standard deviation of the overall least-squares fit to the data could then be used as a criterion for identification of $U^{235}$ vs. $Pu^{239}$. In certain inspection and surveillance applications it is not always necessary to distinguish in detail between $Pu^{239}$ and $U^{235}$ components in a given system, it being sufficient to determine the *combined* $U^{235}$–$Pu^{239}$ (and $U^{233}$, if present) "active" material contribution relative to the $U^{238}$ (or $Th^{232}$) "safe" material ($k_\infty < 1$) contribution in the system. Such an analysis is, of course, readily obtained through appropriate $\overline{R_f}$ and $\overline{S_{f/\Delta}}$ measurements.

In systems where identification by delayed neutron response alone is difficult, one may employ the supplementary technique of high-resolution gamma spectrometry for identification of individual isotopes (this technique is discussed in a later section).

$Th^{232}$ has been largely ignored here for several reasons. Firstly, $Th^{232}$ has nearly an order of magnitude smaller fission cross section for fast neutrons (e.g., fission spectrum to 14 mev.) than the other major fission species. Secondly, with the exception of the new large thorium reactors, $Th^{232}$ is simply not used as a fissionable material in practical fission systems and devices. Its future use will likely be confined to large breeder and converter reactors, where its presence should certainly be well known. Nevertheless, where $Th^{232}$ is a major fissioning species (as in future $Th^{232}$–$U^{233}$-cycle breeder reactors), it can be readily identified and analyzed by the delayed neutron response methods outlined herein. For example, from Table I one obtains good discrimination ratios between $U^{233}$ and $Th^{232}$ of 1.72 and 1.78 (for $R_f^-$ and $S_{f+/\Delta}$ ratios respectively at small $f$); and of course considerably larger discrimination ratios are available from $R_f^+$ and $S_{f+/\Delta}$ measurements at large $f$ (cf. FIGS. 2 and 4).

Separate neutron irradiations with subthreshold fast neutrons ($E_n \leq 1.3$ mev.) and with superthreshold fast neutrons can clearly be used to provide further discrimination between the fissile—and the threshold—fissioning species (notably $U^{235}$, $U^{233}$, and $Pu^{239}$ vs. $U^{238}$). (The delayed neutron parameters, $a_i$ and $\lambda_i$, are not sensitive to the energy of the neutron inducing fission.) Pulsed, modulated or DC neutron sources with $E_n \leq 1.3$ mev. [e.g., accelerator-produced monoenergetic neutrons or soft-spectrum encapsulated or mechanically-modulated radioactive neutron sources such as $Am^{241}$-$\alpha$-$Li^7$ or $Pu^{238}$-$\alpha$-$Li^7$ (viz: movable interleaving surfaces coated alternately with the $\alpha$-emitting material and with $Li^7$) with maximum $E_n \sim 1$ mev.] can be used most effectively to detect fissile species, e.g., $U^{235}$, $Pu^{239}$, $U^{233}$, exclusively, with no contribution whatsoever from threshold fissioning species, e.g., $U^{238}$ and $Th^{232}$.

While almost any degree of neutron moderation will not seriously affect isotope identification and analysis of the thermal fissioning species, $U^{235}$, $Pu^{239}$, and $U^{233}$, it should be noted that neutron moderation (slowing down) in systems containing appreciable amounts of light-element materials can hinder or prevent the identification and analysis (not necessarily the detection) of threshold-fissioning species. In highly heterogeneous systems, there could arise perturbations due to differential self-shielding of delayed neutrons from the different fission species; implicit in the present development is the assumption that a flat-energy-response detector "sees" all delayed neutrons from the system equally well. Fortunately we are dealing with fast neutrons, so the assumption of system "transparency" is generally good, and high-efficiency, flat-response neutron detectors are readily available. Of course, problems are bound to arise in practical applications of delayed neutron kinetic response methods to various types of complex, heterogeneous systems, and a systematic program of experimental investigation of the full potential of the present techniques applied to such systems is clearly indicated.

We now consider, by way of illustration, representative experimental conditions for typical pulsed irradiations of a mixture of fissionable material. Modern compact, portable pulsed neutron sources are capable of producing time-average yields well above $10^{11}$ neutrons/sec. using the $D+T \rightarrow n+He^4$ reaction. The newly developed "neutron flash tube," for example, can produce $\sim 10^{10}$ D,T neutrons in a 30-msec. interval at any desired pulse repetition rate. More intense pulsed neutron sources are being developed specifically for the delayed neutron response techniques described herein, and some two orders of magnitude increase in neutron pulse yields are presently obtainable (e.g., $3 \times 10^{12}$ neutrons in 0.15 $\mu$sec. with a focused dense plasma source). Here we assume, very conservatively, (1) a pulsed source strength of only $10^{10}$ D,T (14 mev.) neutrons/pulse and (2) a geometrical coupling factor of 10% between the source and the system (i.e., roughly one steradian intercepted at the source by the system). Now if we assume a hypothetical system containing a mixture of 5 kg. of $U^{235}$ and 25 kg. of $U^{238}$, all in a steel case for example, a pulse of $10^{10}$ D,T neutrons would produce $\sim 3 \times 10^7$ $U^{235}$ fissions and $\sim 7 \times 10^7$ $U^{238}$ fissions. This would result in the birth of $5 \times 10^5$ $U^{235}$ delayed neutron precursors and $3 \times 10^6$ $U^{238}$ precursors. Assuming a nominal 1% neutron detection efficiency (actually in multi-detector $4\pi$ counting geometries, 90% or higher overall efficiency is readily attainable) the initial delayed neutron counting rates would be $2 \times 10^3$ counts/sec. for $U^{235}$ and $2 \times 10^4$ counts/sec. for $U^{238}$. A total of $5 \times 10^3$ $U^{235}$ delayed neutrons and $3 \times 10^4$ $U^{238}$ delayed neutrons would be detected following each neutron pulse. It must be noted, however, that higher-yield pulsed neutron sources and higher efficiency detectors will increase the above numbers by very large factors (i.e., by $10^2$–$10^4$). In a given experimental situation, of course, the number of pulsed irradiations [as well as the geometry of source(s), system and detector(s)] can be varied as necessary to achieve desired statistical accuracy in each $f$-defined time interval.

With "flat"-energy-response high-efficiency neutron detectors, $\overline{R_f}$ values can be readily measured to considerably better than one percent statistical accuracy in reasonable counting times (minutes, in most cases). The basic kinetic functions $R_{f-}$, $R_{f+}$, and $\Delta \cdot S_{f+/\Delta}$ are known to an accuracy of a few percent, as may be inferred from the uncertainties on the limiting forms $$\sum_i a_i \lambda_i$$

and $$\sum_i a_i/\lambda_i$$

[In Table I the least squares propagated uncertainties in $\Sigma a_i \lambda_i$ range from 2.3% for $U^{238}$ to 6.5% for $U^{233}$, with an average of $\sim 3.6\%$ for all isotopes. The uncertainties in $\Sigma a_i/\lambda_i$ range from 1.2% for $Pu^{239}$ to 1.7% for $Th^{232}$ with an average of $\sim 1.4\%$ for all isotopes.] Values of $(\beta \bar{\nu})^q$ are also known to a few percent accuracy. Therefore the relative number of fissions of each major fissioning isotope present in an unknown mixture can be determined directly and quantitatively by the $\overline{R_f}$ (and $\overline{S_{f/\Delta}}$) methods. Appropriate fission cross section ratios can then be used to determine the relative amounts of each major fissioning isotope present if this further information is desired.

As we have seen, the experimental techniques for measuring $\overline{R_f}$ (or $\overline{S_{f/\Delta}}$) are simple, direct, and do not require expensive equipment. The method does not require absolute detector calibration or fission monitor counting (although in some cases fission ratio determinations—either calculated or measured—may be desirable to determine relative amounts of each major fission species present).

Since $\beta$ decay is essentially forbidden for half lives shorter than $\sim 0.1$ sec., delayed neutrons are not expected, or observed, to exhibit half lives shorter than 0.1 sec. Thus delayed neutron kinetic response methods offer the great advantage that all measurements are made in a time domain which is completely free of time-dependent perturbations due to prompt neutron higher-modes, thermalization and diffusion effects (confined to the sub-millisecond time region), neutron time-of-flight smear, etc. Further important advantages are: (1) "environment insensitivity" (to the presence of inert materials; high radiation backgrounds; to prompt neutron effects; etc.), and (2) the high "penetrability" of fast neutrons through bulk media—clearly of major importance in detection and fission isotope analysis applications.

Equations 17 and 18 can be generalized to an arbitrary number of time intervals for analysis of multichannel-time-analyzer decay data to obtain fractional delayed neutron production in a given system. The fraction $\overline{R_n}$ of delayed neutrons emitted in the $n$th time channel ($t_{n-1} < t < t_n$) following an instantaneous irradiation is [cf. Equation 11]:

$$\overline{R_n} = \frac{\sum_q (\beta \bar{\nu})^q \dot{F}^q T \sum_i a_i \left( e^{-\lambda_i{}^q t_{n-1}} - e^{-\lambda_i{}^q t_n} \right)}{\sum_q (\beta \bar{\nu})^q \dot{F}^q T}$$

Similarly Equation 15 is generalized to the multichannel case:

$$\overline{S_{n/\Delta}} = \frac{\sum_q (\beta \bar{\nu})^q \dot{F}^q \sum_i a_i{}^q/\lambda_i{}^q \left( e^{-\lambda_i{}^q t_{n-1}} - e^{-\lambda_i{}^q t_n} \right)}{\Delta \sum_q (\beta \bar{\nu})^q \dot{F}^q}$$

Thus, in general for $q$ isotopes and $n \geq q$ time intervals, a set of $\overline{R_n}$ (or $\overline{S_{n/\Delta}}$) measurements give $n$ equations in a $q$ unknown coefficients (fractional delayed neutron yields). The number of time intervals, $n$, can be adjusted to suit the precision of the experimental data simply by appropriate grouping of individual time-channel data from the multichannel analyzer. In the usual case $n > q$, standard computer least-squares techniques can be used to obtain best fitted values of fractional delayed neutron yields from measured $\overline{R_n}$ (and $\overline{S_{n/\Delta}}$) data and the known delayed neutron kinetic functions evaluated at each time channel. This more detailed method of computer analysis of $\overline{R_n}$ (and $\overline{S_{n/\Delta}}$) delayed neutron response offers attractive advantages, including some further improvement in isotope-discrimination power. However, for many routine analysis applications the more straightforward $R_f$ method may be preferred for its simplicity and operational utility.

Based on calculated end point energies for the delayed neutron emission spectro from identified fission product precursors, increased discrimination between various fissioning species can be realized by the use of energy biased neutron detectors (or differential neutron energy spectrometers based on the $He^3(n,p)$ or $n,p$ scattering reaction) in the delayed neutron response measurements outlined above. Calculated maximum energies, $E_{n_{max}} = Q_\beta - B_n$, range from 2.04 mev. for $Br^{87}$ (55 sec. delayed group precursor) to 5.2 mev. for $I^{140}$ (0.5 sec. group precursor) and 9.1 mev. for $Br^{93}$ (predicted 0.2 sec. group precursor). As expected from fission product $\beta$-decay systematics, the shorter delayed neutron periods are associated with higher end-point $\beta$ energies, and therefore exhibit correspondingly higher-energy delayed neutron spectra. As noted earlier, these shorter period groups exhibit much greater abundance in the long-chain-length (high neutron/proton ratio) fissioning species such as $U^{238}$ and $Th^{232}$. The "early" delayed neutrons (e.g., those emitted before $f = 1$ sec., say) from these long-chain-length species will exhibit a markedly harder energy spectrum than the corresponding early delayed neutrons emitted from the shorter-chain-length species (e.g., $Pu^{239}$ and $U^{233}$). Also the exceptionally low energy of the longest (55 sec.) delayed neutron group can be exploited to emphasize characteristic differences in the 55 sec.-group relative abundances among the different fission isotopes. Thus, the use of a suitably calibrated energy-dependent detector can provide additional effective isotope discrimination (in nonmoderated or lightly moderated systems) by increasing the discrimination factors (ratios of $R_f$ or $S_{f/\Delta}$ values) between the fissioning isotopes. These spectral measurements—and, in particular, the new energy spectra of the shorter delayed neutron groups ($i = 4$, 5 and 6)—will permit further refinement and extension of this supplementary technique for identification and analysis based on delayed neutron group energy discrimination.

In its most general (and ultimately most incisive) form, the detailed neutron response method described herein would involve the determination of delayed neutron time-energy response matrices for each individual fission species. The measured composite response of an unknown system would then be analyzed (e.g., by computer methods of matrix inversion) into its component response matrices weighted with fractional delayed neutron yields from each individual fission species. The solutions for relative fission rates, relative amounts of various fissioning isotopes present, etc., are then obtained, as usual, from known $(\beta \nu)^q$ and fission cross section data.

An auxiliary or supplementary means of identifying various fissionable materials in an unknown sample following pulsed neutron irradiation involves high-resolution time-dependent gamma spectrometry (e.g., using Li drifted germanium detectors in appropriate coincidence-anticoincidence arrangements) to observe well-resolved gamma lines uniquely characteristic of individual fission species, as e.g., $U^{235}$. The required irradiation, observation and analysis of time-dependent gamma spectra could very conveniently be carried out concurrently with the measurement and analysis of delayed neutron response characteristics. In high-resolution fission product gamma energy spectra, one may also take advantage of the large yield variations (from one fission species to another) of particular fission product activities to aid in identification of individual isotopes. The greatest sensitivity of fission product yields to Z and A of the fissioning species will be found in or near the rapidly varying portions of the fission mass and charge distributions. Though certain characteristic gamma lines can be valuable in some cases for establishing the presence of individual fission species, in general gamma spectrometry cannot compete with the neutron techniques described herein for *analysis* of different fissioning species in bulk systems (cf. very high gamma background in irradiated material and large gamma absorption and self-shielding effects vs. the relative "transparency" of most systems to fast neutrons).

Thus high-resolution time-dependent gamma spectrometry can provide a useful supplementary isotope-identification technique which, when desired, can easily be carried out concurrently with delayed neutron kinetic response methods for identification and analysis of fissionable isotopes.

PRACTICAL APPLICATIONS

Practical methods of detecting and identifying fissionable material are of obvious importance in mining and processing of atomic energy raw materials as well as in many safety, control and regulatory functions of the atomic energy industry. In addition, nondestructive methods of detection, identification and analysis of fissionable material in unknown and/or clandestine systems are clearly fundamental to the rapidly emerging field of international inspection, control, and safeguards of fissionable material against diversion to a multitude of unlawful or destructive purposes. The new methods of detailed delayed neutron kinetic analysis described herein promise a variety of practical applications in many of these areas. The experimental techniques involved are rapid, nondestructive, and relatively simple and inexpensive. The high sensitivity of the $\overline{R_f}$ pulsed response method, for example, in discriminating between different fissionable isotopes is perhaps best exemplified by the practical case of $U^{239} - Pu^{239}$ systems where an effective isotope discrimination factor of $\sim 5$ can be obtained between $Pu^{239}$ and $U^{238}$. (Correspondingly large discrimination factors are obtainable between $U^{233}$ and $Th^{232}$.) Thus, delayed neutron kinetic response methods are admirably suited to the assay of $Pu^{239}$ (or $U^{233}$) in power reactor fuel elements or breeder blanket material, or to rapid, nondestructive evaluation of burnup in irradiated fuel. Similarly, the large effective discrimination factor between $U^{235}$ and $U^{238}$ enables direct determination of isotopic abundances in enriched uranium fuel samples.

It is important to note that the delayed neutron response methods described herein constitute a physical *sensor* of the different fusioning species and therefore can be *calibrated* (for given source, detector arrangement) to give a direct indication of the *absolute* amount of each fissionable species present in an unknown system. Thus, for example, reactor fuel elements of different, but known, composition can be used to calibrate a given isotopic analysis system which then gives the absolute amount of each fission species present in fuel elements of the same type but of unknown isotopic composition.

The basic equipment needed to perform isotopic analysis by the delayed neutron kinetic response technique consists of three basic units: a neutron source, a neutron detector and a time analyzer. The neutron source may be any one of several commercial types (e.g., neutron flash tube, focused plasma device, accelerator, or reactor) capable of producing $\sim 10^{11}$ neutrons per sec. in steady state or modulated operation, or $\sim 10^9$ neutrons per pulse (of not more than $\sim 10$ msec. duration) in the case of pulsed operation. Typical neutron detectors used are $He^3$- or $BF_3$-filled proportional counters in paraffin geometry to give reasonably "flat" energy response, good discrimination against gammas, and an overall detection efficiency of the order of 1 percent of more. The time analyzer unit can range from a simple, improvised, two or three channel gated scaler to a standard commercial multichannel time analyzer, depending upon the detail of the time analysis desired.

Figure 7:
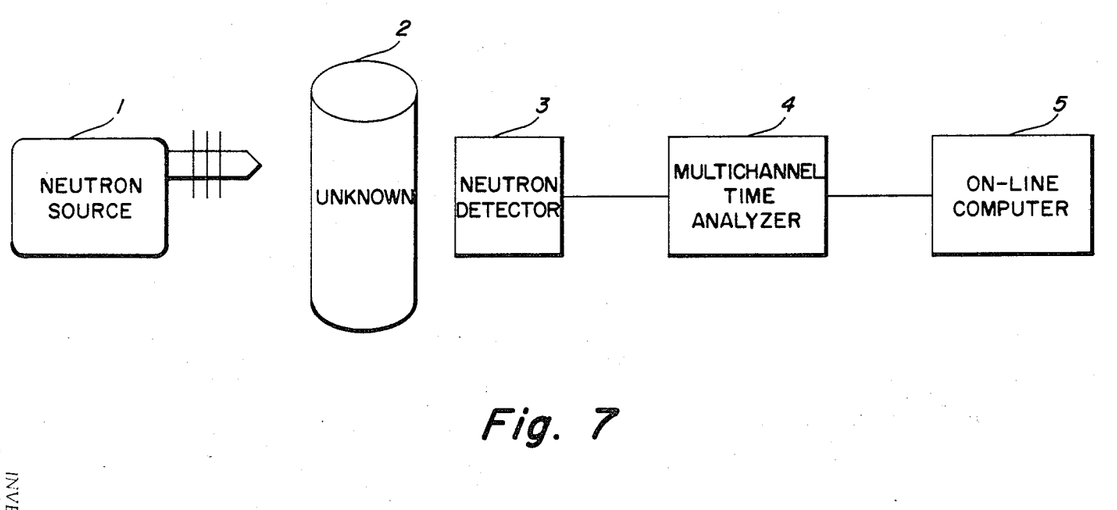
FIGURE 7 is a schematic diagram of a simplified system of the present invention.

FIGURE 7 is a schematic representation of the basic units employed in this invention. A neutron source 1 irradiates the unknown 2 and the delayed neutron kinetic response is monitored by detector 3 and multichannel time analyzer 4. Data from the multichannel time analyzer is fed into a computer 5 to give direct readout of the isotopic assay.

In addition to applications of kinetic response methods to identification and analysis of individual fission isotopes, a further application of considerable practical significance is outlined below. From the data in FIGS. 1–4 and Tables I, II and III it is clear that maximum discrimination is obtained between two major categories of fission material: the so-called "special" (fissile) nuclear materials, $U^{235}$, $Pu^{239(240)}$ and $U^{233}$ on the one hand, and the "safe" (fertile) nuclear materials (notably $U^{238}$ and normal uranium, with $k_\infty < 1$) on the other. This practical distinction between "special" and "safe" nuclear material is obviously important in the field of nuclear inspection, surveillance and control, which is primarily concerned with the detection and identification of "special" nuclear material—without necessarily distinguishing, at first, between $U^{235}$, $Pu^{239(240)}$ and/or $U^{233}$. (Isotope analysis and more sophisticated investigations, if indicated, can be carried out subsequently.)

The special relevance of kinetic response methods to this important practical problem is clear from the simple fact that measured delayed neutron response reveals immediately and unambiguously the presence of "active" nuclear material, as distinct from all other materials. That is, the unique, "tell-tale" delayed neutron response from $U^{235}$, $Pu^{239(240)}$ or $U^{233}$, or any combination of these, cannot be duplicated by *any* other combination of materials (fissionable or nonfissionable). Thus in general, with kinetic response data readily at hand it is essentially impossible to successfully conceal significant amounts of "special" nuclear material. This is not to say that a would-be violator could not contrive concealment schemes based on "neutron-tight" containment, but any container which is "black" to 14 mev. neutrons (as could be ascertained immediately by a simple neutron transmission measurement) would, in nearly every case, be such as to arouse suspicion, whereupon further investigation and analysis could be carried out. The implications here for both national and future international nuclear inspection and surveillance methods are clear.

CRITICAL CONFIGURATIONS

Certain kinetic response characteristics of nuclear chain reacting systems are especially sensitive to the delayed neutrons present in the system. Notable examples are: (1) the decay of neutron flux following a saturation irradiation at delayed critical, terminated by rapid shutdown ("rod drop" response); (2) the decay of neutron flux following an "instantaneous" irradiation produced either by a "prompt burst" excursion in the reactor itself or by an external pulsed neutron source; and (3) the transfer function (both magnitude and phase) of a reactor in the low frequency range, i.e., frequencies comparable to delayed neutron decay constants.

The above readily measurable characteristics of a chain reacting system can be used, under appropriate conditions, to analyze the isotopic composition of fissionable material in the system. Practical methods for performing such nondestructive isotopic analyses are developed herein.

(A) Reactor shutdown or "rod drop" decay analysis

We consider first the reactor shutdown or "rod drop" experiment wherein a reactor is operated at some equilibrium level (delayed critical) and then suddenly shut down by the introduction of a negative reactivity step, $-\Delta k$. For the equilibrium conditions existing prior to the rod drop, the space-independent reactor kinetic equations with no external source and $k_0 = 1$ (i.e., delayed critical operation) become $$0 = \frac{dn}{dt} = \frac{k_{p_0} - 1}{l} n_o + \sum_i \lambda_i C_{i_o} \quad (19)$$

$$0 = \frac{dC_i}{dt} = \frac{\bar{\gamma} \beta_i n_o}{l} - \lambda_i C_{i_o}$$

Thus $$n_o = \frac{l \sum_i \lambda_i C_{i_o}}{1 - k_{p_0}} = \frac{l \sum_i \lambda_i C_{i_o}}{\bar{\gamma} \beta} \quad (20)$$

where $\bar{\gamma}\beta$ represents the total effective delay fraction due to "ordinary" delayed neutrons plus any photoneutrons present. Within a few prompt neutron lifetimes after the drop the system adjusts to a lower neutron level determined by the new prompt reproduction number, $$k_{p_1} < k_{p_0}$$

and remains nearly constant at this "quasistatic level" until it is ultimately decreased by delayed neutron decay. At this quasistatic level the original precursor concentrations, $C_{i_o}$, are still unchanged and $dn/dt \sim 0$, so that $$n_1 \approx \frac{l \sum_i \lambda_i C_{i_o}}{1 - k_{p_1}} \quad (21)$$

and $$\frac{n_1}{n_o} = \frac{1 - k_{p_0}}{1 - k_{p_1}} \approx \frac{\bar{\gamma}\beta}{1 - k_1(1 - \bar{\gamma}\beta)} =$$

$$\frac{1}{k_1(1 + \Delta k / k_1 \bar{\gamma}\beta)} \approx \frac{1}{1 + \Delta k / k_1 \bar{\gamma}\beta}$$

Hence the reactivity value of the rod drop in units of dollars can be obtained directly from the observed ratio of neutron level before and after the drop:

$$\text{Rod value in dollars} \equiv \frac{\Delta k}{k \bar{\gamma} \beta} = \frac{n_o}{n_1 k_1} - 1 \approx \frac{n_o}{n_1} - 1 \quad (22)$$

The post-drop level $n_1$ is determined by extrapolation of the subsequent neutron decay curve back to the time of the drop, which inevitably introduces some uncertainty.

Returning to the reactor kinetic equations, if we now take the Laplace transform of the neutron response $n(t)$ following a step reactivity change $\Delta k$ from initial equilibrium at neutron level $n_o$ we have $$L[n(t)] = n_o \frac{l + \bar{\gamma} \sum_i \frac{\beta_i}{s + \lambda_i}}{sl + ks\bar{\gamma} \sum_i \frac{\beta_i}{s + \lambda_i} + \Delta k} \quad (23)$$

where $s$ is the transform variable. Now the limit of $L[n(t)]$ as $s \to o$ is the infinite integral of $n(t)$:

$$\lim_{s \to o} L[n(t)] \equiv \lim_{s \to o} \int_0^\infty e^{-st} n(t) dt = \int_0^\infty n(t) dt$$

so from Equation 23 with $a_i \equiv {}_i\beta_i/\beta$, we have $$\lim_{s\to 0} L[n(t)] = n_o \frac{\frac{l}{\bar{\gamma}\beta} + \sum a_i/\lambda_i}{\Delta k/\bar{\gamma}\beta} = \int_0^\infty n(t)dt$$

Since nearly all systems have prompt neutron lifetimes, $l$, which are small compared to $\bar{\gamma}\beta\Sigma a_i/\lambda_i \approx 8.3\times 10^{-2}$ (numerical value for $U^{235}$ with $\bar{\gamma}=1$) we have the practical result $$\text{Rod worth in dollars} = \frac{\Delta k}{k\bar{\gamma}\beta} \approx \frac{(n_o/k)\sum a_i/\lambda_i}{\int_0^\infty n(t)dt}$$

$$\approx \frac{12.75 n_o}{\int_0^\infty n(t)dt} \quad (24)$$

where $$\sum_i a_i/\lambda_i = 12.75$$

is the numerical value for $U^{235}$. In Equation 24, $n_o$ is the neutron counting rate before the rod drop and $$\int_0^\infty n(t)dt$$

is the total neutron count following the drop. No appreciable error is introduced by small uncertainties in the time the integral count is started. It may be noted that this technique does not require separate measurement of differential neutron flux vs. time during delayed neutron decay and it avoids bothersome uncertainties in extrapolation of detector response back to zero time.

As with any rod-drop experiment, good results depend upon equal sampling by the detector of pre-drop and post-drop flux. The resulting elimination or minimization of the spatial dependence of measured reactivity can usually be accomplished by judicious location of the detector (or detectors), i.e., at a point (or points) where response will be proportional to *total* flux in the system both before and after the drop. Combining Equations 22 and 24 we have $$\Sigma a_i/\lambda_i = \left[\frac{1}{n_1} - \frac{k_1}{n_o}\right] \int_0^\infty n(t)dt \approx \left[\frac{1}{n_1} - \frac{1}{n_o}\right] \int_0^\infty n(t)dt \quad (25)$$

expressing the kinetic function $\Sigma a_i/\lambda_i$ in terms of measurable rod drop quantities, $n_o$ and $n_1$, the neutron counting rates before and after the drop, and $$\int_0^\infty n(t)dt$$

the total neutron count following the drop. Now the quantity $\Sigma a_i/\lambda_i$ is rather sensitively dependent upon fission species. Precise numerical values of $\Sigma a_i/\lambda_i$ and $\Sigma a_i\lambda_i$, together with their least-squares propagated uncertainties for all the major fission species, are included in Table I giving first and second moments of the delayed neutron decay constants and mean-lives.

For mixed isotope systems, let [W] symbolize the process of weighting with delayed neutron production $(\bar{\beta\nu})^q \dot{F}^q$, from each fission species, $q$. Then Equation 25 becomes $$[W]\sum_i a_i/\lambda_i \equiv \frac{\sum_q (\bar{\beta\nu})^q \dot{F}^q \sum_i a_i{}^q/\lambda_i{}^q}{\sum_q (\bar{\beta\nu})^q \dot{F}^q}$$

$$= \left[\frac{1}{n_1} - \frac{k_1}{n_o}\right]\int_0^\infty n(t)dt \approx \left[\frac{1}{n_1} - \frac{1}{n_o}\right]\int_0^\infty n(t)dt \quad (26)$$

representing a delayed-neutron-yield weighted sum of the known kinetic functions, $$\sum_i a_i{}^q/\lambda_i{}^q$$

for each species, $q$. The appropriate value of $k_1 \approx 1$ can be estimated from the rod drop value in dollars, as given by the factor, $n_o/n_1 - 1$; it should be noted that results are not sensitively dependent upon the assumed value of $k_1$.

Thus analysis of rod drop decay (i.e., integral decay data—complete time-dependent decay data are not required) can be used to identify and analyze the delayed neutron production from the major fissioning species present in a chain-reacting system of unknown composition. From known delayed neutron yields $(\bar{\beta\nu})^q$ for each species the relative number of fissions of each major fissioning species present in the unknown (reasonably homogeneous) system can then be determined by the methods described below. Using appropriate fission cross section ratios, it is then possible to determine the relative amounts of each major fissioning isotope present, if this further information is desired.

If necessary, corrections to observed decay constants and abundances for subcritical multiplication effects following a rod drop can be calculated from the following equations (assuming initial saturation of all delayed neutron group precursors):

$$a_i' = \frac{\beta_i}{\beta + \Delta k}$$

$$\lambda_i' = \lambda_i \left[1 - \frac{\beta_i}{\beta + \Delta k}\right] \quad (27)$$

The shape of the observed delayed neutron decay is quite insensitive to the actual worth of the rod drop. Viz $\Delta k$ introduces only a constant scale factor on all abundances with no change in *shape* of the decay, and $\Delta k$ introduces only a slight perturbation on $\lambda_i$ for $\Delta k \gtrsim 10\beta$ (i.e., $\gtrsim \$10$ rod drop). Also, since we are looking only at the shape of the *delayed* neutron decay, the troublesome perturbations due to higher prompt harmonics are automatically eliminated.

Although the rod drop method just described is clearly best for short drop times (short compared to delayed neutron periods), any actual rod drop always requires some finite time for completion. In those cases where drop times are not sufficiently short, the question arises as to the most appropriate time to choose as the effective drop time for an idealized instantaneous rod drop of the same magnitude. The most direct approach is to determine that effective instantaneous drop time, $T_{\text{eff}}$, which gives the same flux-vs.-time dependence as the actual flux decay curve at long times (many $\tau_1$) after the drop. To develop an expression for $T_{\text{eff}}$, we first consider the $n(t)$ dependence following an idealized reactivity step function. Taking the inverse Laplace transform of Equation 23 for a true reactivity step, $\Delta k$, yields a simple superposition of exponentials for $n(t)$ behavior:

$$n(t) = \sum_{j=1}^{7} N_j e^{\omega_j t} \quad (28)$$

where the $\omega_j$ (also called $S_j$) are the roots of the "inhour equation" and the normalized coefficients $N_j$ are given by $$N_j = \frac{l + \sum_{i=1}^{6} \frac{\beta_i}{\omega_j + \lambda_i}}{l + k\sum_{i=1}^{6} \frac{\beta_i \lambda_i}{(\omega_j + \lambda_i)^2}} \quad (29)$$

Turning now to an actual rod drop of the same overall reactivity worth, $\Delta k$, but of finite duration, the true reactivity-vs.-time profile of the drop can be inserted into the RTS kinetics code or its equivalent and the resulting neutron flux vs. time computed (using iterative methods). Now if we let $N'_j$ represent the values of the RTS-computed flux amplitude coefficients (in an exponential superposition for $n(t)$ similar to Equation 28 at the end of the finite rod drop, then the decay of neutron density, or flux, for $t > T$ (where $T$ is the duration of the finite drop) can be represented by $$n(t) = \sum_{j=1}^{7} N'_j e^{\omega_j(t-T)} \quad (30)$$

At long times after the drop, the flux decay reduces to a single exponential term in $\omega_1$ (corresponding to the longest delayed neutron period) so that for $t \gg \tau_1$, Equations 28 and 30, can be equated as follows:

$$N_1 e^{\omega_1(t-T_{eff})} = N'_1 e^{\omega_1(t-T)} \text{ for } t \gg \tau_i \quad (31)$$

Equation 31 is the desired expression for $T_{eff}$ which gives the same flux-vs.-time dependence as the actual flux decay curve at long times after the drop.

Of course any slight dependence of a given rod drop measurement on residual subcritical multiplication and/or finite drop time can be observed directly by repeating the measurement at various values of subcritical multiplication and drop time.

If the system under investigation is well shutdown ($\geq$ \$10 subcritical) following a rod drop, we have $\lambda_1 \approx \lambda_1'$, and as we have seen the $a_i$ and $a_i'$ can differ only by a constant factor, and hence do not *affect* the shape of delayed neutron decay. Then one may apply the time-fiducial $\overline{S_f}$ analysis method (described earlier under "Subcritical Configurations") for the case $f \ll \tau_1$. Thus defining $\overline{S_f}$ for a mixed isotope system as the fraction of all delayed neutrons which are emitted prior to the time fiducial $f$, we have from Equation 14:

$$[W]\sum_i a_i/\lambda_i = f[\overline{S_f}]^{-1} =$$

$$f\left[\frac{\text{total delayed neutron counts}}{\text{counts observed prior to } f}\right] \text{ for } f \ll \tau_i \quad (32)$$

The above expression for the delayed-neutron-yield weighted sum of the kinetic functions $$\sum_i a_i/\lambda_i$$

is expressed in terms of the shape of the delayed neutron decay only, and thus avoids possible perturbations due to prompt neutron harmonics (e.g., as could be present in the $n_1$ term in Equation 26.

Except in the case $f \ll \tau_1$ referred to above, the $\overline{S_f}$ analysis method just mentioned does not lend itself to isotope analysis applications. An alternative formulation is the ratio $\overline{S_{f+/\Delta}}$ of delayed neutrons emitted following time fiducial $f$ (i.e., for $f < t < \infty$) to those emitted in a fixed short time interval, $\Delta \ll \tau_i$.

$$\overline{S_{f+/\Delta}} = \frac{\sum_q (\beta\bar{\nu})^q \dot{F}^q \sum_i (a_i^q/\lambda_i^q) e^{-\lambda_i^q f}}{\Delta \sum_q (\beta\bar{\nu})^q \dot{F}^q} \quad (16)$$

This expression has the desired tractable form of a weighted sum of known delayed neutron kinetics functions for each isotope, $q$, the weighting function being, as before, the fractional delayed neutron production from each fission species. (Note that in the limit $$f \ll \tau_i, \overline{S_{f+/\Delta}} \rightarrow \Delta^{-1}[W]\Sigma a_i/\lambda_i$$

which is essentially the reciprocal of $S_f$.)

By varying $f$ in $\overline{S_{f+/\Delta}}$ measurements, one can obtain any desired number of determinations of relative delayed neutron production in an unknown system. Also to check on possible perturbations due to initial power level and self-multiplication of the shutdown system following the rod drop, $\overline{S_{f+/\Delta}}$ measurements can be repeated at various initial power levels and at various shutdown reactivity values. If necessary, appropriate corrections can be applied for these effects as well as finite rod drop times.

Figure 5:
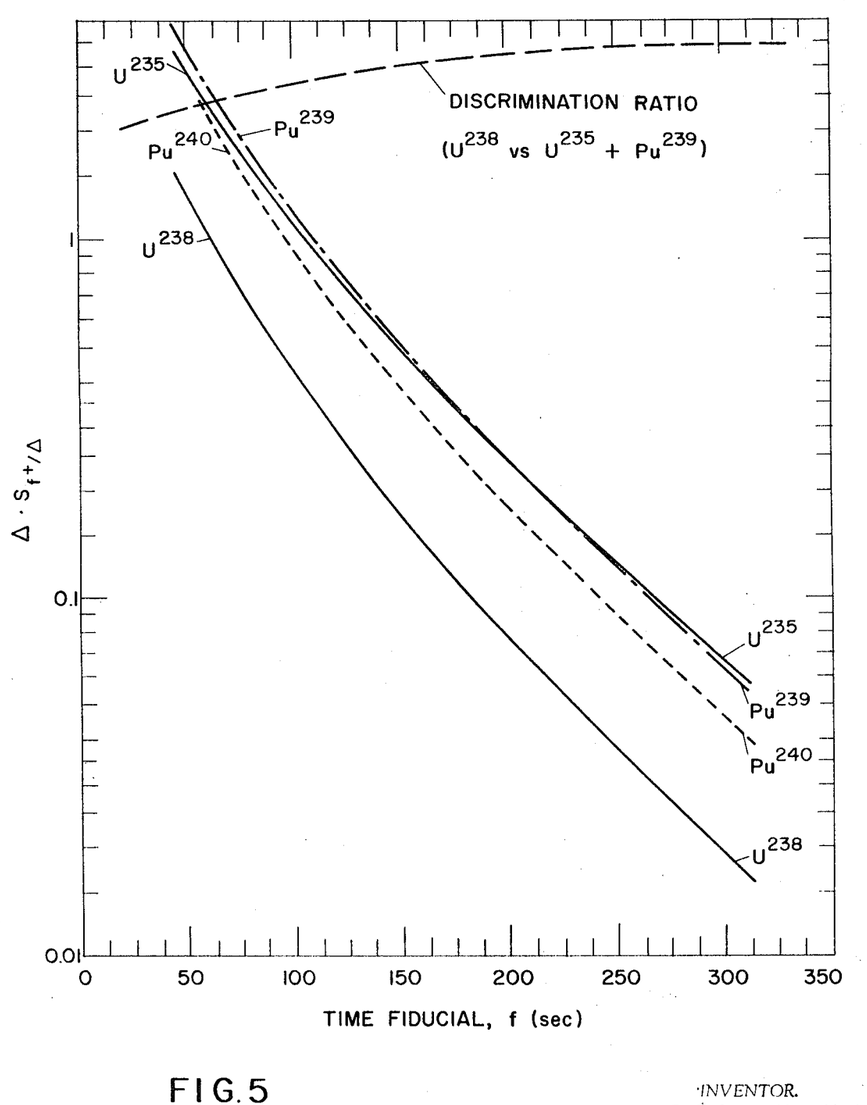
FIGURE 5 is a plot of $\Delta \cdot S_{f+/\Delta}$ functions against time fiducial, $f$, for various isotopes.

It is noteworthy that the $\overline{S_{f+/\Delta}}$ method provides maximum discrimination between $U^{238}$ and the "special" nuclear materials (notably $U^{235}$ and $Pu^{239}$) at large $f$ values. This is illustrated in FIG. 5 showing $\Delta \cdot \overline{S_{f+/\Delta}}$ for the species $U^{235}$, $Pu^{239(240)}$, $U^{238}$ and the ratios (dashed curve) of $\Delta \cdot \overline{S_{f+/\Delta}}$ values for $U^{238}$ compared to an average of $U^{235}$ and $Pu^{239}$ together. It will be noted that $\Delta \cdot \overline{S_{f+/\Delta}}$ values for $Pu^{239}$ are greater than those for $U^{235}$ at small $f$ and are smaller than for $U^{235}$ at large $f$. At the cross-over point, ~175 sec., $\Delta \cdot \overline{S_{f+/\Delta}}$ values for $Pu^{239}$ and $U^{235}$ are equal so a measurement at this value of $f$ would distinguish between $U^{238}$ and the combined $U^{235}$ plus $Pu^{239(240)}$ present, with an effective discrimination factor of 3.1, as shown by the dashed curve in FIG. 5. $\overline{S_{f+/\Delta}}$ measurements at other $f$ values can of course be used to distinguish between $U^{235}$ and $Pu^{239}$ and other isotopes, if present (cf. FIG. 4).

The ultimate in isotope discrimination power is to be expected from a multichannel analysis of delayed neutron decay following shutdown, rather than the $f$ time-fiducial method used in $\overline{S_{f+/\Delta}}$ analysis (which, for a single $f$ value, amounts to two time channels). Thus Equation 16 can be generalized to an arbitrary number of time channels (the nth time channel being the interval $t_{n-1} < t < t_n$) as follows:

$$\overline{S_{n/\Delta}} = \frac{\sum_q (\beta\bar{\nu})^q \dot{F}^q \sum_i a_i^q/\lambda_i^q (e^{-\lambda_i^q t_{n-1}} - e^{-\lambda_i^q t_n})}{\Delta \sum_q (\beta\bar{\nu})^q \dot{F}^q} \quad (33)$$

Thus, in general for $q$ isotopes and $n \geq q$ time intervals, a set of $\overline{S_{n/\Delta}}$ measurements give $n$ equations in $q$ unknown coefficients (fractional delayed neutron yields). The number of time intervals, $n$, can be adjusted to suit the precision of the experimental data simply by appropriate grouping of individual time-channel data from the multichannel time analyzer. In the usual case $n > q$, standard computer least-squares techniques can be used to obtain best fitted values of fractional delayed neutron yields from measured $\overline{S_{n/\Delta}}$ data and the known delayed neutron kinetic functions evaluated at each time channel. This more detailed method of computer analysis of $\overline{S_{n/\Delta}}$ delayed neutron response offers attractive advantages, including some further improvement in isotope-discrimination power. However, for many routine rod-drop analysis applications the more direct $f$ time-fiducial methods discussed herein will probably be generally preferred for their simplicity and operational utility.

(B) Pulsed reactor or pulsed source decay analysis

We consider now the decay of neutron flux following an "instantaneous" irradiation produced by one of two methods: (1) a "prompt burst" excursion plus scram shutdown of a pulsed reactor itself or (2) by pulsing the shutdown system with an external pulsed neutron source of sufficiently large yield. [The Dense Plasma Focus device recently described provides an extremely intense, compact, pulsed neutron source (~$10^{13}$ D,T neutrons in ~$10^{-7}$ sec.) which should be quite adequate for pulse decay analysis of some types of reactors.] If the reactor or chain-reacting system is well shutdown ($\geq$ \$10 subcritical) following such instantaneous irradiations, then the $\overline{R_f}$ method of isotopic analysis developed heretofore can be applied directly. Perturbations due to residual self-multiplication following the burst can be investigated—and often essentially eliminated—by varying the final multiplication of the system.

In cases where multiplication effects cannot be eliminated by reducing residual multiplication sufficiently, then appropriate corrections can be applied, as described above. Isotope discrimination factors and average delayed neutron decay "slopes" obtainable by the $R_f$ method are summarized in Tables II and III. The pulsed source decay method requires measurements only on the shape of *delayed* neutron decay, so that troublesome perturbations due to prompt harmonics are eliminated.

It may be noted that pulse decay analyses involve essentially measurements of the kinetic parameters, $\Sigma a_i \lambda_i$ while rod drop analyses (and transfer function analyses to be discussed below) involve the parameters $\Sigma a_i/\lambda_i$. In this sense the two types of analyses are complementary, giving nearly independent determinations of isotopic abundance.

In all kinetic response experiments described herein (both saturation and instantaneous irradiations), the use of suitably calibrated energy-dependent detectors can provide additional effective isotope discrimination (in non-moderated or lightly moderated systems) by increasing the discrimination factors between the individual fissioning isotopes.

(C) Reactor transfer function analysis

The zero power reactor transfer function $W(j\omega)$ expresses the complex response (amplitude and phase) of neutron density to small oscillations of reactivity with time; $W(j\omega)$ can be written $$W(j\omega) = \frac{\gamma \beta}{j\omega \left[ l + \bar{\gamma}\beta \sum_i a_i/(j\omega + \lambda_i) \right]} \quad (34)$$

where $j \equiv \sqrt{-1}$, and $\omega$ is the angular frequency of the impressed reactivity oscillation in radians/sec. $W(j\omega)$ represents the fractional change in power level per unit amplitude of the reactivity oscillation. At low frequencies ($\omega^2 \ll \lambda_i^2$) the transfer function magnitude, $|W|$, approaches the asymptotic form:

$$|W| = \frac{1}{\omega} \{\omega^2[\Sigma a_i/\lambda_i^2]^2 + [\Sigma a_i/\lambda_i]^2\}^{-1/2} \quad (35)$$

for $\omega^2 \ll \lambda_i^2$ and $l/\beta \ll \Sigma_i/\lambda_i$. For all practical purposes these conditions are satisfied for $\omega \leq 10^{-2}$. Unfortunately, Equation 35 being nonlinear does not lend itself to isotope analysis applications, but it can be reduced to the desired linear form $$|W|[\omega \Sigma a_i/\lambda_i]^{-1} \quad (36)$$

subject to the further condition that $$\omega \ll \frac{\Sigma a_i/\lambda_i}{\Sigma a_i/\lambda_i^2}$$

It can be seen from the data in Table I that this condition is reasonably well satisfied in the frequency range $10^{-3} < \omega \leq 10^{-2}$. The asymptotic form of Equation 36 gives the following $|W|$ dependence at low frequencies:

$$|W| = 0.0785\omega^{-1} \text{ for } U^{235}$$
$$|W| = 0.1302\omega^{-1} \text{ for } U^{238} \quad (37)$$
$$|W| = 0.0683\omega^{-1} \text{ for } Pu^{239}$$

Figure 6:
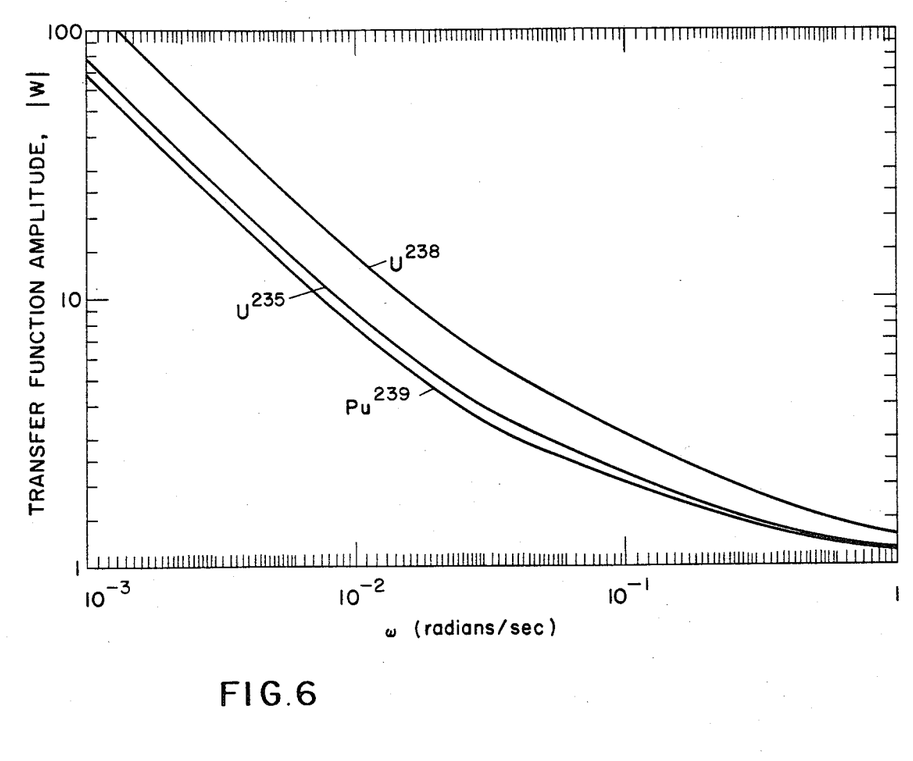
FIGURE 6 is a graph of reactor transfer function amplitude $|W|$ for various isotopes against frequency $\omega$ (in radians/sec.).

Computer calculated $|W|$ values vs. $\omega$ are plotted in FIG. 6 for $U^{235}$, $U^{238}$ and $Pu^{239}$. The $|W|$ curves in FIG. 6 are seen to approach their low-frequency asymptotic form (i.e., straight line with slope $-1$ on log log plot) in the range $10^{-3} < \omega \leq 10^{-2}$.

In Table IV we compare $|W|$ and $\Phi$ values at $\omega = 10^{-2}$ (a representative low frequency) and at $\omega = 10$ (a representative higher frequency, where delayed neutron effects are no longer important and $|W|$ approaches unity).

TABLE IV.—TRANSFER FUNCTION MAGNITUDE AND PHASE COMPARISONS AT REPRESENTATIVE LOW AND HIGH FREQUENCIES ($l \ll \beta \Sigma a_i/\lambda_i$)

|  | $\omega=10^{-2}$ | | $\omega=10$ | |
|---|---|---|---|---|
|  | $|W|$ | $\Phi$ | $|W|$ | $\Phi$ |
| $U^{235}$ | 8.6578 | −72.02 | 1.0054 | −2.41 |
| $U^{238}$ | 13.9611 | −75.46 | 1.0128 | −4.29 |
| $Pu^{239}$ | 7.4822 | −71.68 | 1.0046 | −2.17 |

Values of $|W|$ at $\omega=10^{-2}$, normalized to the value of $|W|$ at $\omega=10$, stand in the following ratios ("isotope discrimination ratios") for the various species considered here:

$$U^{238}/U^{235} = 1.60$$
$$U^{238}/Pu^{239} = 1.85$$
$$U^{235}/Pu^{239} = 1.16$$

Values of $\Phi$ at $\omega=10^{-1}$ exhibit the following phase differences (in degrees)

$$U^{238} - U^{235} = 7.5°$$
$$U^{238} - Pu^{239} = 11.0°$$
$$U^{235} - Pu^{239} = 3.5°$$

In general, $|W|$ values can be determined experimentally to better than 1% and phase angles can be measured to approximately $\pm 1°$, so the technical feasibility of isotope discrimination via transfer function analysis is clear. We see from the above indicated isotope discrimination ratios that measurements of the *shape* of the $|W|$ vs. $\omega$ curve (i.e., $|W|$ values at low frequencies normalized to $|W| \approx 1$ at high frequency) can provide a quantitative indication of the fission-isotope composition of an unknown system. Only the ratio of two $|W|$ values is used in this method so that absolute calibrations of detectors, source, etc., are not required. Isotopic analysis by the $|W|$ shape factor method can be augmented by measured phase at a given low frequency, as for example at $\omega = 10^{-1}$.

The asymptotic form of the reactor transfer function given in Equation 36 for a single fission isotope is readily extended to a composite system; viz the reciprocal of $|W|$ for a composite system containing $q$ isotopes is $$|W|^{-1}_{\text{comp.}} = \frac{\omega \sum_q (\beta \bar{\nu})^q \bar{F}^q \sum_i a_i^q/\lambda_i^q}{\sum_q (\beta \bar{\nu})^q \bar{F}^q} \quad (38)$$

which is a delayed-neutron-yield weighted sum of the known kinetic functions $$\sum_i a_i^q/\lambda_i^q$$

Thus measured values of $$|W|^{-1}_{\text{comp.}}$$

for various $\omega$ (in the low frequency range, $\omega \leq 10^{-2}$) can be used to determine relative delayed neutron yields from each major fissioning isotope in an unknown system. In such an analysis a linear superposition of the known functions $$\sum_i a_i^q/\lambda_i^q$$

with unknown coefficients (fractional delayed neutron yields) is obtained at each $\omega$ value. The number of such simultaneous equations in these coefficients can be adjusted to suit the precision of the experimental data, and standard computer least squares techniques used to obtain best fitted values of fractional delayed neutron yields. The relative number of fissions of each major fission species can then be determined from known delayed neutron yields, and the relative amounts of each fission species then estimated from appropriate fission cross section ratios.

Reactor transfer functions are inherently difficult to measure at the low frequencies of interest here ($10^{-3} < \omega \leq 10^{-2}$), due to stability problems, power-swing limitations on permissible reactivity amplitudes, and long-term drift effects. This is true of the conventional pile oscillator method, as well as newer statistical methods such as pile noise spectrum measurements, and cross-correlation of pseudorandom modulated reactivity or modulated sources. Despite these difficulties it should certainly be possible to measure low frequency transfer functions with sufficient accuracy for application of the isotopic analysis technique described herein. The pile oscillator method, for example, can be extended to low frequencies ($\omega \leq 10^{-2}$) by use of input-output cross-correlation techniques with long correlation times to reduce drift and uncorrelated background response. At present the rod drop method (taking Fourier transform of rod drop decay to get transfer function) or the pulse response method (taking Laplace transform of pulse response to get transfer function) appear to offer the best means of measuring low frequency transfer functions. The use of transfer functions in reactor isotopic analysis would clearly be most advantageous on those reactors where transfer function measuring equipment is already installed and in use.

Finally, it should be noted that the problem of nondestructive isotopic analysis in large power reactors will always be complicated by large spatial heterogeneities, when present, i.e., when the relative concentrations of fissioning nuclei (and also fission rate) depend strongly on position within the reactor. Such space dependent effects [location and geometry of sources, differential shielding due to intervening material between various source points and detector(s)], will inevitably complicate any scheme for isotopic analysis of "in place" components in large heterogeneous reactors. In view of this very fundamental limitation, one seeks the maximum penetrability (through typical reactor materials) for both the "probe" (if used) and the "response signal" employed in an isotopic analysis scheme. Clearly fast neutrons (e.g., 14 mev. as "probe" and ~0.5 mev. (delayed neutrons) as "response signal") will best satisfy this fundamental "penetrability" criterion. In addition, the use of a fast-neutron response signal permits maximum "environment insensitivity" inasmuch as fast neutron detectors can be designed to discriminate very effectively against high radiation backgrounds. In many practical cases, if a well-defined highly-penetrating (e.g., 14 mev.) fast neutron beam is used as a probe, the delayed neutrons observed will have originated from the known "ray path" of the incident probe neutrons.

Despite the great advantages of maximum penetrability, environment insensitivity, and isotope discrimination afforded by fast neutron observation, the inherent complexities introduced by large spatial (and energy) heterogeneities in some reactors remain formidable indeed. This suggests an empirical approach to isotope identification in complex reactors whereby the kinetic response methods described herein are calibrated—for a given type of reactor—against different, known, isotopic compositions. Where strong spatial effects are observed, they can generally be dealt with by suitable spatial distribution of detectors. Local changes in isotopic composition (e.g., breeding in blanket material) can be investigated with fast neutron detectors suitably located around (and/or within) the reactor (viz in different representative regions of core, reflector, or blanket). The development of miniature pulsed neutron probe-plus-response instrumentation is already quite advanced for applications in the oil well logging field. Such existing technology could perhaps be incorporated into an "isotope-assay probe" (or an "isotope-assay shutdown rod") specifically designed and located for assay and inspection purposes in power reactors (e.g., reentrant in reflector of fast breeders).

Even in complex large heterogeneous systems, then, each of the kinetic response methods described herein can be viewed as a physical *sensor* of different fissioning species, exhibiting a *measurable change* in response which is directly calibrated against a *known change* in isotopic composition at a given representative position in a given type of reactor (thereby assuring proper neutron importance weighting at each position). The spatial symmetry characteristics of most practical systems would limit the required number of representative (unique) detector locations to a reasonably small number. Of course, in reasonably homogeneous reactors (and probably even in many heterogeneous systems) these added complexities of space-dependent instrumentation would be quite unnecessary for practical isotopic analysis applications.

What is claimed is:

1. A method of nondestructive detection, identification and analysis of the individual fission species in an unknown mixture comprising irradiation of said mixture with a source of neutrons, measuring the delayed neutron response from said mixture and determining the composition of said mixture by analysis of the delayed neutron response in terms of the known neutron response for each of the individual fission species.

2. The method of claim 1 wherein the delayed neutron response measured is the kinetic response in terms of time and energy.

3. The method of claim 1 wherein the neutron source is pulsed.

4. The method of claim 1 wherein the gamma energy spectra from said mixture is also detected and analyzed.

5. The method of claim 1 wherein the neutron source and detectors are calibrated in absolute values to determine the absolute amounts of fissionable materials present in said mixture.

6. A method of nondestructive isotopic analysis in operating reactors comprising detecting and measuring the neutron flux from the reactor prior to shutdown, shutting down the reactor, measuring the delayed neutron flux after shutdown and determining the isotopic composition of the material within the reactor by analysis of the pre-shutdown and post-shutdown flux in terms of known flux decay characteristics for each of the individual fission species.

7. An apparatus for the nondestructive detection, identification and analysis of individual fission species in an unknown mixture comprising neutron source means for irradiating the mixture, detection means to detect the delayed neutron kinetic response from the mixture, and analyzing means for identifying and determining quantitatively the individual fission species comprising the mixture using the known delayed neutron kinetic response for each individual fission species.

8. The apparatus of claim 7 wherein the analyzing means is a multichannel time and energy analyzer and an on-line computer.

9. The apparatus of claim 8 wherein the neutron source means is an accelerator.

References Cited

G. R. Keepin, Physics of Nuclear Kinetics, Adam Wesley Publishing Co., Reading, Mass. (1965).

RALPH G. NILSON, Primary Examiner

M. J. FROME, Assistant Examiner

U.S. Cl. X.R.

250—83.3